(12) United States Patent
Chen

(10) Patent No.: US 12,516,965 B1
(45) Date of Patent: Jan. 6, 2026

(54) ASSEMBLY STRUCTURE FOR RANGEFINDER POSITIONING DEVICE

(71) Applicant: Zige Chen, Shenzhen (CN)

(72) Inventor: Zige Chen, Shenzhen (CN)

(*) Notice: Subject to any disclaimer, the term of this patent is extended or adjusted under 35 U.S.C. 154(b) by 0 days.

(21) Appl. No.: 19/328,101

(22) Filed: Sep. 12, 2025

(30) Foreign Application Priority Data

Aug. 8, 2025 (CN) .......................... 202521679179.8

(51) Int. Cl.
*G01D 11/24* (2006.01)
(52) U.S. Cl.
CPC .................................. *G01D 11/245* (2013.01)
(58) Field of Classification Search
None
See application file for complete search history.

(56) References Cited

U.S. PATENT DOCUMENTS 11,079,254 B2 * 8/2021 Hahn ..................... G01D 5/145
11,733,074 B2 * 8/2023 Escoffier ................ F16M 11/18
378/208
12,447,906 B2 * 10/2025 Wang ................... G01D 11/245

FOREIGN PATENT DOCUMENTS

KR 102232145 B1 * 3/2021 ............. G01S 17/08

* cited by examiner

Primary Examiner — Peter J Macchiarolo
Assistant Examiner — Jermaine L Jenkins
(74) Attorney, Agent, or Firm — Birchwood IP

(57) ABSTRACT

An assembly structure for a rangefinder positioning device is provided; an installation recess is provided on a surface housing of a rangefinder main body. An independent electronic locator can be disassembled and assembled through an installation hole in a center of an installation buckle. The installation buckle can be detachably provided in the installation recess by magnetic attraction, and a user can easily disassemble and install the electronic locator he wants to install; for example, when a rangefinder is needed for outdoor golf activities, it can be easily provided with the mature and popular AirTag on the market to achieve the positioning and anti-loss of the rangefinder by an AirTag software on a mobile phone. When the rangefinder is not needed or not needed for positioning, the AirTag can be easily disassembled and used for other purposes, which can save the design and manufacturing costs of the rangefinder.

9 Claims, 3 Drawing Sheets

ASSEMBLY STRUCTURE FOR RANGEFINDER POSITIONING DEVICE

CROSS-REFERENCE TO RELATED APPLICATIONS

This application claims priority to Chinese Patent Application No. 202521679179.8, filed on Aug. 8, 2025, which is hereby incorporated by reference in its entirety.

TECHNICAL FIELD

The present disclosure relates to the field of rangefinder anti-loss technologies, and in particular, to an assembly structure for a rangefinder positioning device.

BACKGROUND

Nowadays, there are more types of rangefinders for personal use on the market. Most users will carry and use rangefinders during outdoor activities, such as in golf. Handheld small rangefinders are a commonly used and convenient device, and are now widely used in golf. However, this handheld small rangefinder often falls or is lost during outdoor golf activities. Traditional rangefinder products lack effective positioning and retrieval methods, which cannot meet the needs of users for positioning and searching. However, to install a positioning system inside the traditional rangefinder, it is necessary to develop an internal installation structure, corresponding positioning hardware, as well as corresponding control programs, software, or mini programs, which will greatly increase the design and manufacturing costs of the rangefinder equipment. Therefore, it is necessary to make design improvements to the positioning structure of the rangefinder.

SUMMARY

In view of this, the present disclosure provides an assembly structure for a rangefinder positioning device. In response to the problems of the prior art, an installation recess is designed on a surface housing of a rangefinder main body, and an independent electronic locator can be disassembled and assembled to solve the existing technical problems.

The purpose of the present disclosure is achieved through the following technical solutions.

An assembly structure for a rangefinder positioning device, including:
  a rangefinder main body;
  an installation recess, which is provided on a surface housing of the rangefinder main body;
  an installation buckle, which is configured to be disassembled and correspondingly provided in the installation recess, and a center of the installation buckle is provided with an installation hole;
  an electronic locator, which is configured to be disassembled and tightly provided in the installation hole;
  a bottom of an inner side or a side of the installation recess is provided with first magnetic attraction parts, and a lower side of the installation buckle is provided with second magnetic attraction parts corresponding to the number and position of the first magnetic attraction parts; the installation buckle is configured to be detachably provided in the installation recess through the second magnetic attraction parts magnetically attracting the first magnetic attraction parts.

In some embodiments of the present disclosure, there are three first magnetic attraction parts that are evenly distributed on an inner side or an outer side of a bottom of the installation recess; the number and position of the second magnetic attraction parts correspond to the first magnetic attraction parts.

In some embodiments of the present disclosure, the first magnetic attraction parts are magnets, and the second magnetic attraction parts are magnetic conductive plates.

In some embodiments of the present disclosure, the first magnetic attraction parts are magnetic conductive plates, and the second magnetic attraction parts are magnets.

In some embodiments of the present disclosure, the first magnetic attraction parts are magnets, and the second magnetic attraction parts are magnets.

In some embodiments of the present disclosure, the installation recess is circular, triangular, rectangular or polygonal, and the installation buckle is a shape configured to be embedded in the installation recess.

In some embodiments of the present disclosure, the electronic locator is an AirTag, and the installation hole is a circular hole corresponding to a shape of the AirTag.

In some embodiments of the present disclosure, a top of a side of the installation recess is provided with an installation notch, and a side of the installation buckle is provided with an edge corresponding to the installation notch.

In some embodiments of the present disclosure, an upper of the installation hole in a middle of the installation buckle is provided with a limit edge.

The beneficial effects of the present disclosure are as follows.

The present disclosure designs an installation recess on the surface housing of the rangefinder main body, and an independent electronic locator can be disassembled and assembled through the installation hole in the center of the installation buckle. The installation buckle can be detachably provided in the installation recess by magnetic attraction, and a user can easily disassemble and install the electronic locator he wants to install; for example, when a rangefinder is needed for outdoor golf activities, it can be easily installed with the mature and popular AirTag on the market to achieve the positioning and anti-loss of the rangefinder by an AirTag software on a mobile phone. When the rangefinder is not needed or not needed for positioning, the AirTag can be easily disassembled and used for other purposes, which can save the design and manufacturing costs of the rangefinder, lower the purchasing and usage costs for users, and be more conducive to the promotion and use of the product.

Numeral reference: 10-rangefinder main body, 20-installation recess, 21-first magnetic attraction part, 22-installation notch, 30-installation buckle, 31-installation hole, 32-second magnetic attraction part, 33-edge, 34-limit edge, 40-electronic locator.

DESCRIPTION OF EMBODIMENTS

Below, a detailed description of the disclosed embodiments will be provided in combination with the accompanying drawings.

The following specific examples are used to illustrate the implementation mode of the present disclosure, and those skilled in the art can easily understand other advantages and effects of the present disclosure from the content disclosed in this specification. Obviously, the embodiments described are only a part of the disclosed embodiments, not all of them. The present disclosure can also be implemented or applied through different specific implementation modes, and various details in this specification can be modified or changed based on different perspectives and applications without departing from the spirit of the present disclosure. It should be noted that, without conflict, the following embodiments and their features can be combined with each other. Based on the embodiments disclosed in the present disclosure, all other embodiments obtained by those skilled in the art without creative work are within the protection scope of the present disclosure.

In order to provide an independent electronic locator to a rangefinder, reduce product design and manufacturing costs, and facilitate user assembly and use of the locator, the specific content of the present disclosure is as follows.

Figure 1:
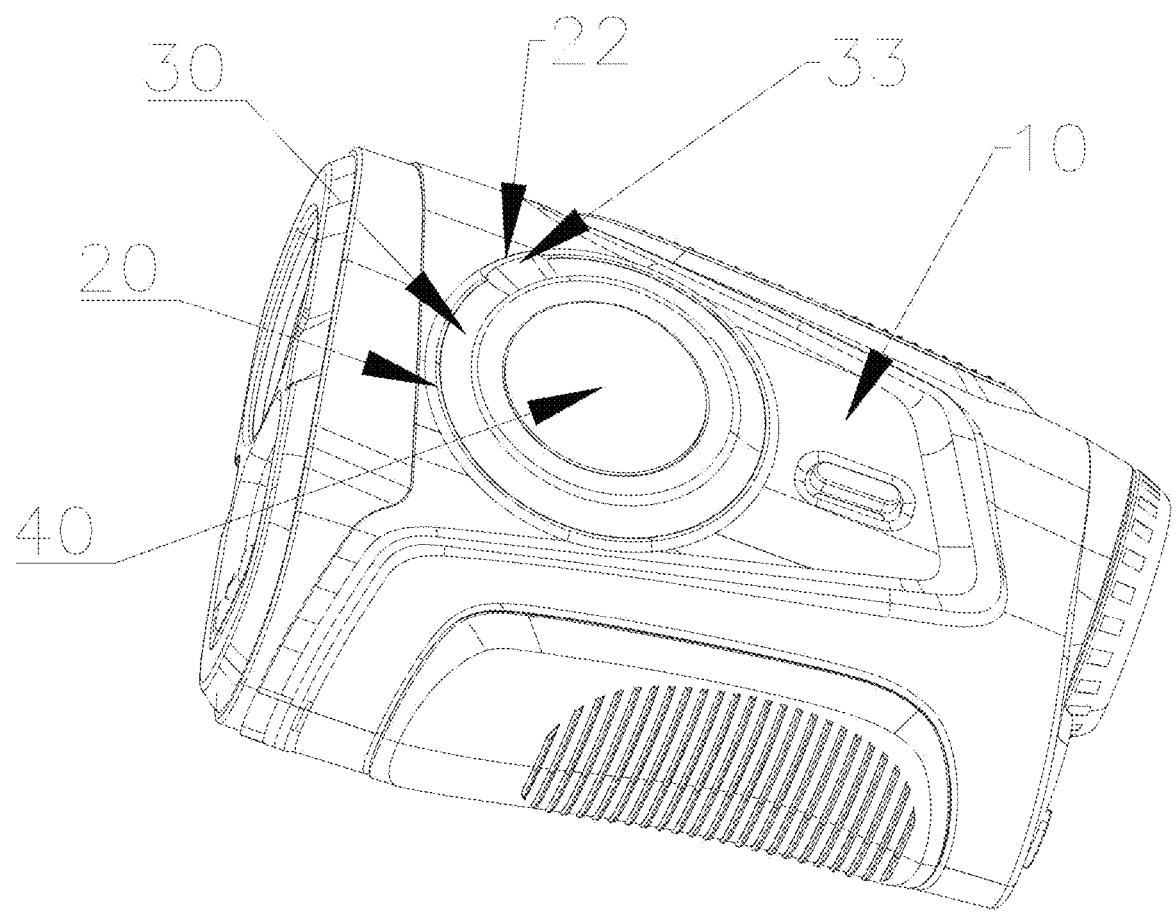
FIG. 1 is a schematic diagram of an assembly structure for a rangefinder positioning device in the present disclosure.
Figure 2:
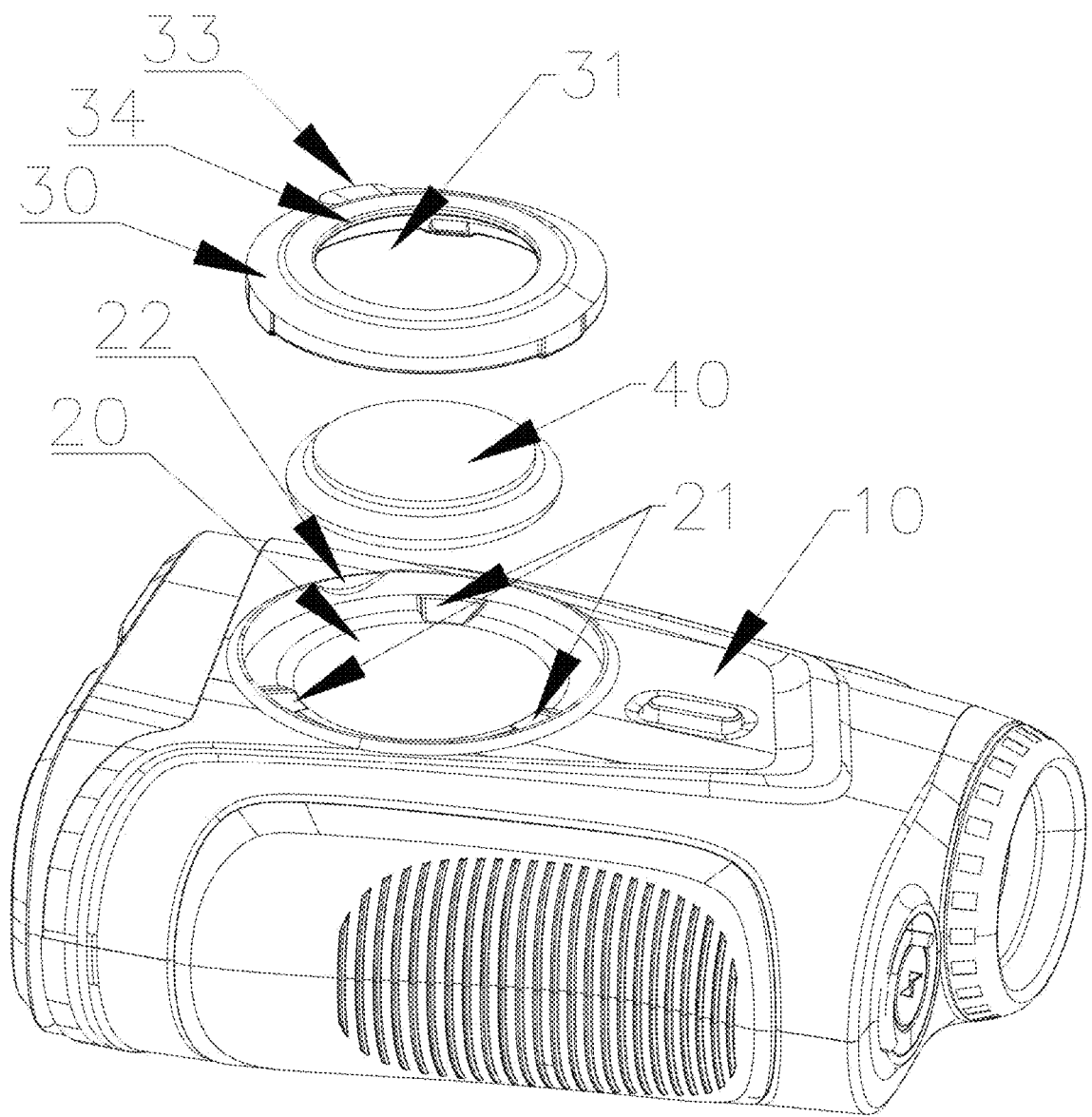
FIG. 2 is a schematic diagram of a disassembly of the assembly structure for a rangefinder positioning device in the present disclosure.
Figure 3:
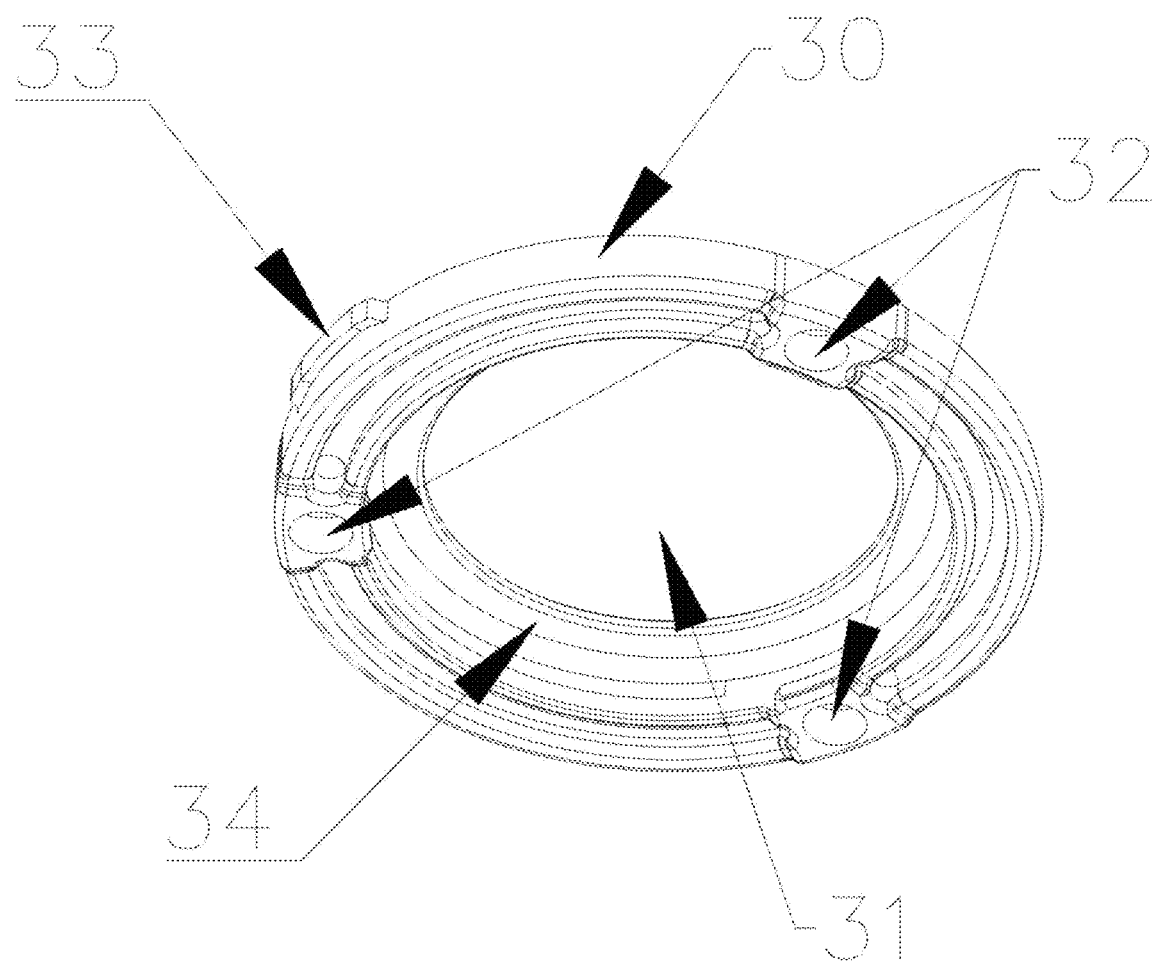
FIG. 3 is a schematic diagram of an installation buckle in the present disclosure.

As shown in FIGS. 1, 2, and 3, an embodiment of the present disclosure is an assembly structure for a rangefinder positioning device. The assembly structure for a rangefinder positioning device includes a rangefinder main body 10, an installation recess 20, an installation buckle 30, and an electronic locator 40.

The installation recess 20 is provided on a surface housing of the rangefinder main body 10. The installation buckle 30 is detachably provided in the installation recess 20. A center of the installation buckle 30 is provided with an installation hole 31.

The electronic locator 40 can be disassembled and tightly installed in the installation hole 31. A tight fitting installation here is also for the convenience of disassembling and assembling the electronic locator 40. It is convenient for a user to remove the electronic locator 40 when not using a rangefinder or when the rangefinder does not need positioning.

A bottom of an inner side or a side of the installation recess 20 is provided with first magnetic attraction parts 21, and a lower side of the installation buckle 30 is provided with second magnetic attraction parts 32 corresponding to the number and position of the first magnetic attraction parts 21. The installation buckle 30 is detachably provided in the installation recess 20 through the second magnetic attraction parts 32 magnetically attracting the first magnetic attraction parts 21.

In an implementation mode, the electronic locator 40 is an AirTag, and the installation hole 31 is a circular hole corresponding to a shape of the AirTag. AirTag is a common and widely used independent locator on the market, and is a positioning device used in combination with Apple phones, which is very convenient for a user to assemble and use.

The present disclosure is to be configured to provide the installation recess 20 on the surface housing of the rangefinder main body 10. An independent electronic locator 40 can be disassembled and assembled through the installation hole 31 in a center of the installation buckle 30. The installation buckle 30 can be detachably provided in the installation recess 20 by magnetic attraction, and the user can easily disassemble and install the electronic locator 40 he wants to install. For example, when a rangefinder is needed for outdoor golf activities, it can be easily provided with the mature and popular AirTag on the market, and to achieve the positioning and anti-loss of the rangefinder by AirTag software on a mobile phone. When the rangefinder is not needed or not needed for positioning, the AirTag can be easily disassembled and used for other purposes, which can save the design and manufacturing costs of the rangefinder, lower the purchasing and usage costs for users, and be more conducive to the promotion and use of the product.

In an implementation mode, as shown in FIGS. 2 and 3, to achieve a more stable magnetic attraction fixation, there are three first magnetic attraction parts 21 that ae evenly distributed on an inner side or an outer side of a bottom of the installation recess 20, and the number and position of the second magnetic attraction parts 32 correspond to the first magnetic attraction parts 21. The three first magnetic attraction parts 21 are arranged in a triangular position, and the installation buckle 30 is magnetically attracted to the three first magnetic attraction parts 21 through the three second magnetic attraction parts 32, which can be more stably embedded in the installation recess 20.

In an implementation mode, the first magnetic attraction parts 21 are magnets, and the second magnetic attraction parts 32 are magnetic conductive plates; or in an implementation mode, the first magnetic attraction parts 21 are magnetic conductive plates, and the second magnetic attraction parts 32 are magnets; or in an implementation mode, the first magnetic attraction parts 21 are magnets, and the second magnetic attraction parts 32 are magnets. Usually, both the first magnetic attraction parts 21 and the second magnetic attraction parts 32 are magnets, which can better ensure the stability of the installation of the installation buckle 30 and prevent it from falling off during movement. Of course, if the magnetic strength is strong enough, the magnetic conductive plates can also be used on one side to reduce costs, which can be set according to the specific magnetic attraction force.

In an implementation mode, the installation recess 20 is circular, triangular, rectangular, or polygonal, and the installation buckle 30 is a shape configured to be embedded in the installation recess 20. Here, it is generally configured to be circular, which saves a surface area occupied by the rangefinder main body 10. Of course, it can also be designed as square, triangular, polygonal, etc., and corresponding designs can be made according to the appearance design needs.

In an implementation mode, as shown in FIGS. 1 and 2, to facilitate the disassemble of the installation buckle 30, by the user; an installation notch 22 is provided at a top of a side of the installation recess 20, and an edge 33 corresponding to the installation notch 22 is provided on a side of the installation buckle 30. When the installation buckle 30 needs to be removed, the edge 33 can be directly used to remove the installation buckle 30 with force, rendering it convenient for the user to operate.

In an implementation mode, as shown in FIG. 3, to prevent the electronic locator 40 from falling off from an upper part of the installation hole 31, a limit edge 34 is provided on the upper part of the installation hole 31 in a middle of the installation buckle 30. When the electronic locator 40 is installed from the bottom of the installation buckle 30 and tightened, the limit edge 34 will press against an upper side of the electronic locator 40 to prevent excessive installation and falling off from the upper part.

The above is only for illustrating the embodiments of the present disclosure and is not intended to limit the present disclosure. For those skilled in the art, any modifications, equivalent substitutions, improvements, etc. made within the spirit and principles of the present disclosure without creative labor should be included in the protection scope of the present disclosure.

What is claimed is:

1. An assembly structure for a rangefinder positioning device, comprising:
    a rangefinder main body;
    an installation recess, which is provided on a surface housing of the rangefinder main body;
    an installation buckle, which is configured to be disassembled and correspondingly provided in the installation recess, and a center of the installation buckle is provided with an installation hole;
    an electronic locator, which is configured to be disassembled and tightly provided in the installation hole;
    a bottom of an inner side or a side of the installation recess is provided with first magnetic attraction parts, and a lower side of the installation buckle is provided with second magnetic attraction parts corresponding to the number and position of the first magnetic attraction parts;
    the installation buckle is configured to be detachably provided in the installation recess through the second magnetic attraction parts magnetically attracting the first magnetic attraction parts.

2. The assembly structure for a rangefinder positioning device according to claim 1, wherein there are three first magnetic attraction parts that are evenly distributed on an inner side or an outer side of a bottom of the installation recess;
    the number and position of the second magnetic attraction parts correspond to the first magnetic attraction parts.

3. The assembly structure for a rangefinder positioning device according to claim 1, wherein the first magnetic attraction parts are magnets, and the second magnetic attraction parts are magnetic conductive plates.

4. The assembly structure for a rangefinder positioning device according to claim 1, wherein the first magnetic attraction parts are magnetic conductive plates, and the second magnetic attraction parts are magnets.

5. The assembly structure for a rangefinder positioning device according to claim 1, wherein the first magnetic attraction parts are magnets, and the second magnetic attraction parts are magnets.

6. The assembly structure for a rangefinder positioning device according to claim 1, wherein the installation recess is circular, triangular, rectangular or polygonal, and the installation buckle is a shape configured to be embedded in the installation recess.

7. The assembly structure for a rangefinder positioning device according to claim 1, wherein the electronic locator is an AirTag, and the installation hole is a circular hole corresponding to a shape of the AirTag.

8. The assembly structure for a rangefinder positioning device according to claim 1, wherein a top of a side of the installation recess is provided with an installation notch, and a side of the installation buckle is provided with an edge corresponding to the installation notch.

9. The assembly structure for a rangefinder positioning device according to claim 1, wherein an upper of the installation hole in a middle of the installation buckle is provided with a limit edge.

* * * * *